United States Patent
Showalter et al.

[11] Patent Number: 5,878,624
[45] Date of Patent: Mar. 9, 1999

[54] SINGLE RAIL SHIFT OPERATOR ASSEMBLY

[75] Inventors: Dan J. Showalter, Plymouth; Ronald A. Schoenbach, Farmington Hills, both of Mich.

[73] Assignee: Borg-Warner Automotive, Inc., Sterling Heights, Mich.

[21] Appl. No.: 870,534

[22] Filed: Jun. 6, 1997

[51] Int. Cl.[6] ................................ F16H 61/34
[52] U.S. Cl. .................... 74/473.37; 74/473.19; 74/335; 74/89.15
[58] Field of Search ............... 74/89.14, 89.15, 74/335, 473 R, 473.19, 473.36, 473.37

[56] References Cited

U.S. PATENT DOCUMENTS

| | | | |
|---|---|---|---|
| 1,225,144 | 5/1917 | Land | 192/2 |
| 1,258,921 | 3/1918 | McCarrell | 74/334 |
| 1,546,672 | 7/1925 | Peacock | 192/71 |
| 1,551,512 | 8/1925 | Goff | 200/47 |
| 1,696,178 | 12/1928 | Ahlm | 74/473.26 |
| 1,822,335 | 9/1931 | Brown | 192/94 |
| 2,280,641 | 4/1942 | Snow | 74/477 |
| 2,446,393 | 8/1948 | Russell | 192/2 |
| 2,508,564 | 5/1950 | Cardwell et al. | 74/364 |
| 2,649,813 | 8/1953 | Barth et al. | 74/335 |
| 2,709,725 | 5/1955 | Bieber et al. | 260/4 |
| 3,319,479 | 5/1967 | Iavelli et al. | 74/333 |
| 3,367,205 | 2/1968 | Ratliff | 74/477 |
| 3,625,633 | 12/1971 | Nelson | 416/169 |
| 3,669,476 | 6/1972 | Wilson | 287/53 R |
| 4,220,051 | 9/1980 | Catlett | 74/89.15 |
| 4,261,536 | 4/1981 | Melcher et al. | 244/155 |
| 4,354,396 | 10/1982 | Charles | 74/104 |
| 4,381,166 | 4/1983 | Smart | 414/685 |
| 4,425,814 | 1/1984 | Dick | 74/89.15 |
| 4,428,248 | 1/1984 | Broucksou et al. | 74/335 |
| 4,440,035 | 4/1984 | Foulk | 74/89.15 |
| 4,449,416 | 5/1984 | Huitema | 74/336 |
| 4,498,350 | 2/1985 | Ross | 74/89.15 |
| 4,523,491 | 6/1985 | Dittmann, Jr. | 74/360 |
| 4,619,151 | 10/1986 | Trachman et al. | 74/335 |
| 4,793,458 | 12/1988 | Shealy | 192/141 |
| 4,805,472 | 2/1989 | Aoki et al. | 74/335 |
| 4,879,919 | 11/1989 | Sekizaki | 74/337.5 |
| 5,205,179 | 4/1993 | Schneider | 74/335 X |
| 5,460,060 | 10/1995 | Nellums | 74/89.15 X |
| 5,689,997 | 11/1997 | Schaller | 74/335 |

*Primary Examiner*—Khoi Q. Ta
*Attorney, Agent, or Firm*—Brinks, Hofer, Gilson & Lione; Greg Dziegielewski

[57] ABSTRACT

A transfer case having a two-speed drive assembly includes a directly coupled shift operator with feedback. The shift operator includes an electric, pneumatic or hydraulic motor which directly, rotatably drives a shift rail. The shift rail includes threads and receives a shift fork having complementary threads. The shift fork engages a dog clutch. Bi-directional rotation of the shift rail correspondingly bi-directionally translates the shift fork to select direct drive (high gear), reduced speed drive (low gear) or neutral operation of the two-speed drive assembly. A shift rail position sensor provides data to associated logic and command circuitry regarding the actual position of the shift fork.

15 Claims, 5 Drawing Sheets

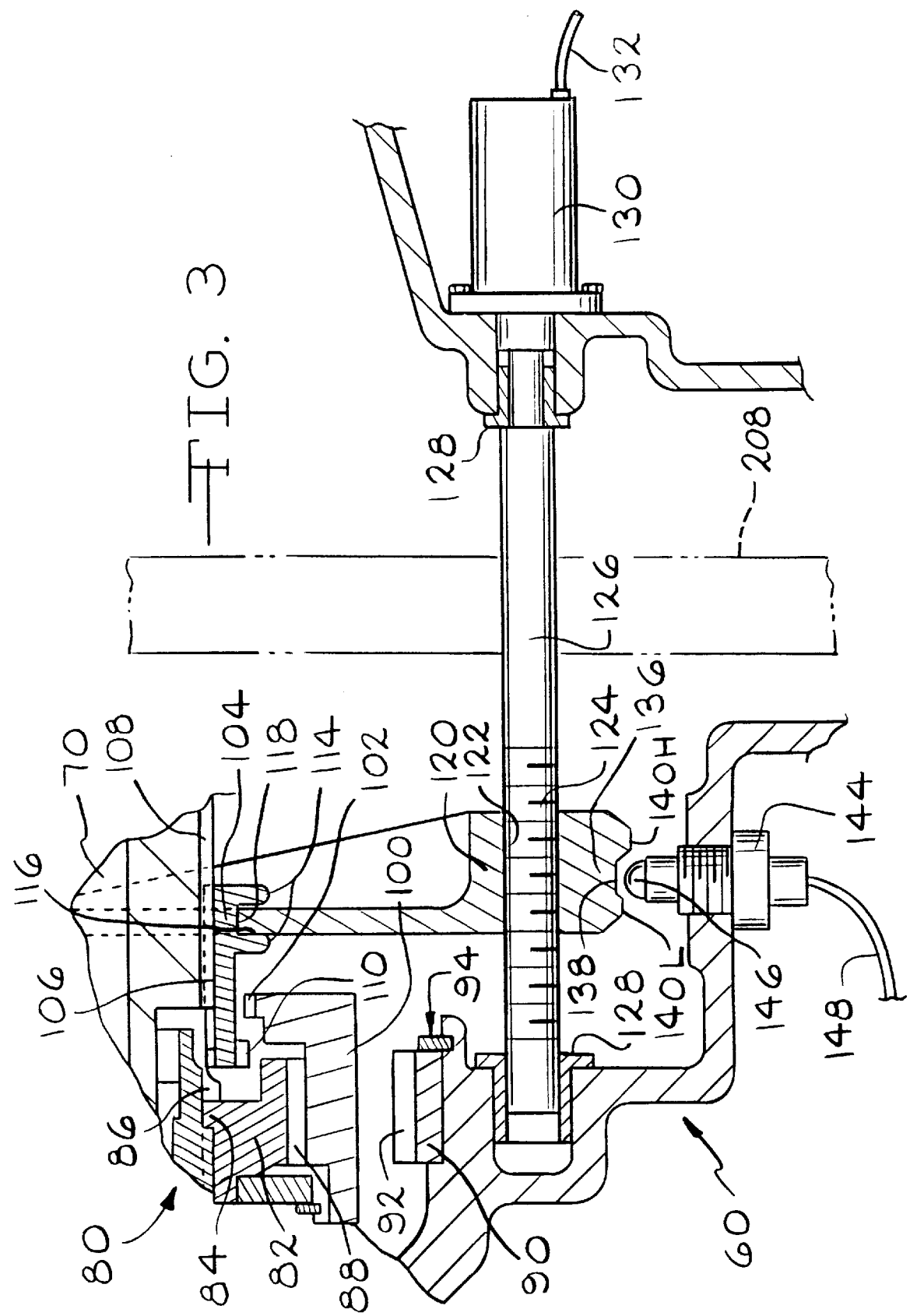

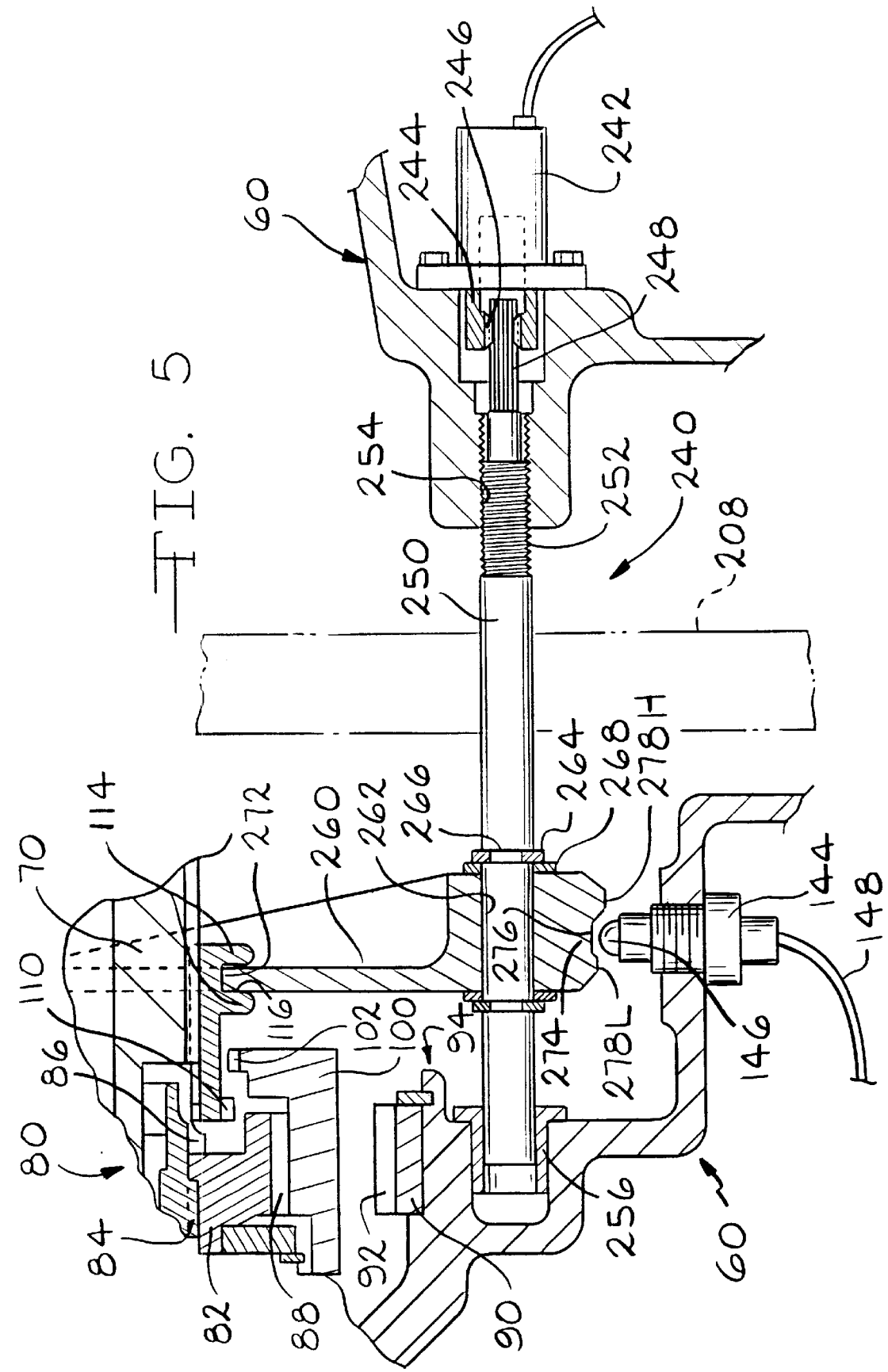

SINGLE RAIL SHIFT OPERATOR ASSEMBLY

BACKGROUND OF THE INVENTION

The invention relates generally to shift operators for speed change gearing and more specifically to a shift operator having a single shift rail and feedback assembly for use in motor vehicle drive line components such as transmissions, transfer cases, differentials and the like.

In many motor vehicle drive line components such as transfer cases, a two-speed assembly typically including a planetary gear speed reduction unit, provides a high and low speed range which provides optimum vehicle operation on conventional roads and off-road situations, respectively. When engaged, the speed reduction assembly reduces the speed of the output of the vehicle transmission by a factor of approximately three to four. Thus, while the automatic transmission operates in its normal speed range and with normal shift points, the transfer case output shaft speed and vehicle speed is correspondingly reduced. When the transfer case speed reduction assembly is disengaged or by-passed, the input and output speeds of the transfer case are the same. Such speed reduction assemblies also commonly provide a neutral position which disconnects the transmission output from the motor vehicle drive line.

The mechanism which achieves the range selection of the speed reduction assembly has many different configurations.

In U.S. Pat. No. 4,770,280 a rotating cam axially translates a cam follower and associated shift rail which correspondingly translates a clutch collar through at least one compression spring. The spring temporarily stores energy if an attempted shift results in gear clashing until synchronism is achieved and then completes the shift.

In U.S. Pat. No. 5,407,024, a dog clutch is engaged by a shift fork which includes a cam follower. The shift fork and cam follower are moved bi-directionally by a circular cam which is rotated by an electric motor through an energy storing spring. Again, if attempted engagement of two gears causes interference and clashing, the energy storing spring allows the drive motor to complete its motion and the energy stored in the spring completes the shift when gear tooth interference ceases.

As to providing feedback signals to a controller regarding the actual position of a shift fork in such a two-speed operator assembly, numerous designs provide no feedback whatsoever. Others such as U.S. Pat. No. 5,159,847 provide feedback regarding the operational state of a transfer case but such feedback is derived from the location of a part distinct from and often remote from the actual shift fork. In U.S. Pat. No. 5,052,245, a position sensor is operably disposed adjacent a shift rail and thus provides its position, not the position of the shift fork.

It is apparent from a review of the foregoing prior art patents as well as prior art shift rail operators and sensors that improvements in these assemblies are both possible and desirable.

SUMMARY OF THE INVENTION

A transfer case having a two-speed drive assembly includes a directly coupled shift operator with feedback. In the preferred embodiment, the shift operator includes an electric, pneumatic or hydraulic motor which directly, rotatably drives a shift rail. A portion of the shift rail is threaded and receives a shift fork which includes a complementarily threaded through aperture. The shift fork engages a dog clutch. Bi-directional rotation of the shift rail correspondingly, bi-directionally translates the shift fork to select direct drive (high gear), reduced speed drive (low gear) or neutral operation of the two-speed drive assembly. The shift fork includes a cam and proximately disposed position sensor provides data to associated logic and command circuitry regarding the actual position of the shift fork. Two alternate embodiments of the shift rail operator assembly are also presented.

Thus it is an object of the present invention to provide a shift operator assembly having a motor, a single rotating shift rail, a shift fork and a feedback assembly for use in motor vehicle drive line components.

It is a still further object of the present invention to provide a shift operator assembly having a single rotating shift rail which is directly driven by a motor.

It is a still further object of the present invention to provide a shift operator assembly having a rotating shift rail, a shift fork and a proximately disposed sensor which provides a signal regarding the actual position of the shift fork.

It is a still further object of the present invention to provide a shift operator assembly having a single rotating, threaded shift rail, a motor and a shift fork having a complementarily configured threaded opening in the shift fork.

It is a still further object of the present invention to provide a shift operator assembly having a single rotating, threaded shift rail, a motor and a shift fork which is freely rotatably disposed and axially restrained upon the shift rail.

It is a still further object of the present invention to provide a shift operator assembly having a single rotating, threaded shift rail, a motor, a shift fork which is freely rotatably disposed and axially restrained upon the shift rail, and a proximately disposed sensor which provides a signal regarding the actual position of the shift fork.

It is a still further object of the present invention to provide a shift operator assembly having a drive motor, a linear ball screw assembly, a shift rail and a shift fork secured to the shift rail.

It is a still further object of the present invention to provide a shift operator assembly having a drive motor, a linear ball screw assembly, a shift rail, a shift fork secured to the shift rail, and a proximately disposed sensor which provides a signal regarding the actual position of the shift fork.

Further objects and advantages of the present invention will become apparent by reference to the following description of the preferred embodiment and appended drawings wherein like reference numbers refer to the same component, element or feature.

BRIEF DESCRIPTION OF THE DRAWINGS

FIG. 3 is an enlarged, fragmentary, sectional view of a shift rail operator assembly according to the present invention;

FIG. 5 is an enlarged, fragmentary, sectional view of a first alternate embodiment shift rail operator assembly according to the present invention.

DESCRIPTION OF THE PREFERRED AND ALTERNATE EMBODIMENTS

Figure 1:
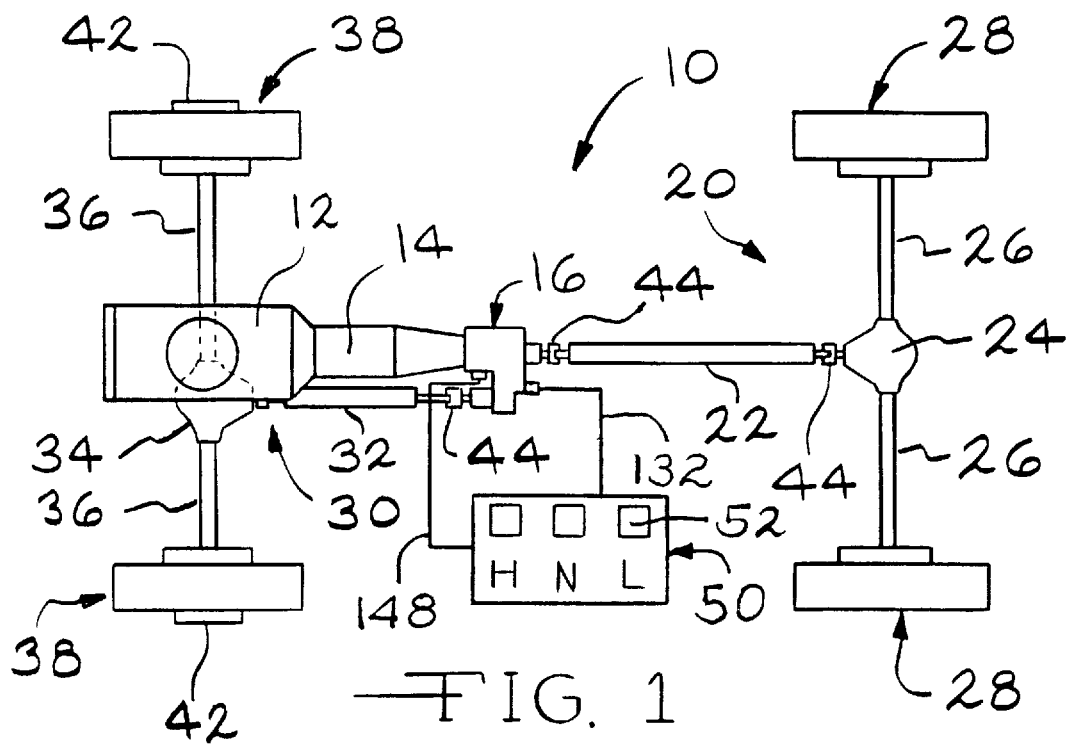
FIG. 1 is a diagrammatic view of a motor vehicle power train having a transfer case which incorporates the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a transmission 14. The output of the transmission 14 directly drives a transfer case assembly 16 which provides motive power to a primary or rear drive line 20 comprising a primary or rear propshaft 22, a primary or rear differential 24, a pair of live primary or rear axles 26 and a respective pair of primary or rear tire and wheel assemblies 28.

The transfer case assembly 16 also selectively provides motive power to a secondary or front drive line 30 comprising a secondary or front propshaft 32, a secondary or front differential assembly 34, a pair of live secondary or front axles 36 and a respective pair of secondary or front tire and wheel assemblies 38. The front tire and wheel assemblies 38 may be directly coupled to a respective one of the front axles 36 or, if desired, a pair of manually or remotely activatable locking hubs 42 may be operably disposed between the front axles 36 and a respective one of the tire and wheel assemblies 38 to selectively connect same. Finally, both the primary drive line 20 and the secondary drive line 30 may include suitable and appropriately disposed universal joints 44 which function in conventional fashion to allow static and dynamic offsets and misalignments between the various shafts and components.

Mounted within the passenger cabin in a location proximate the driver of the motor vehicle is a control assembly 50 having a plurality of push buttons 52 which correspond to the various driver selectable operating positions of the transfer case assembly 16 such as high, neutral and low. Alternatively, the push buttons 52 may be replaced by a rotary switch or other analogous driver selectable input device. The control assembly 50 may include various electronic computation, logic and output devices as well as devices which receive signals and provide logic decisions based upon feedback or signals provided by components of the transfer case assembly 16.

The foregoing and following description relates to a vehicle wherein the rear drive line 20 functions as the primary drive line, i.e., it is engaged and operates substantially all the time and, correspondingly, the front drive line 30 functions as the secondary drive line, i.e., it is engaged and operates only part-time or in a secondary or supplemental fashion, such a vehicle commonly being referred to as a rear wheel drive vehicle.

These designations "primary" and "secondary" are utilized herein rather than "front" and "rear" inasmuch as the invention herein disclosed and claimed may be readily utilized in transmissions and transfer cases wherein the primary drive line 20 is disposed at the front of the vehicle and the secondary drive line 30 is disposed at the rear of the vehicle, such designations primary and secondary thus broadly and properly characterizing the function of the individual drive lines rather than their specific locations.

Figure 2:
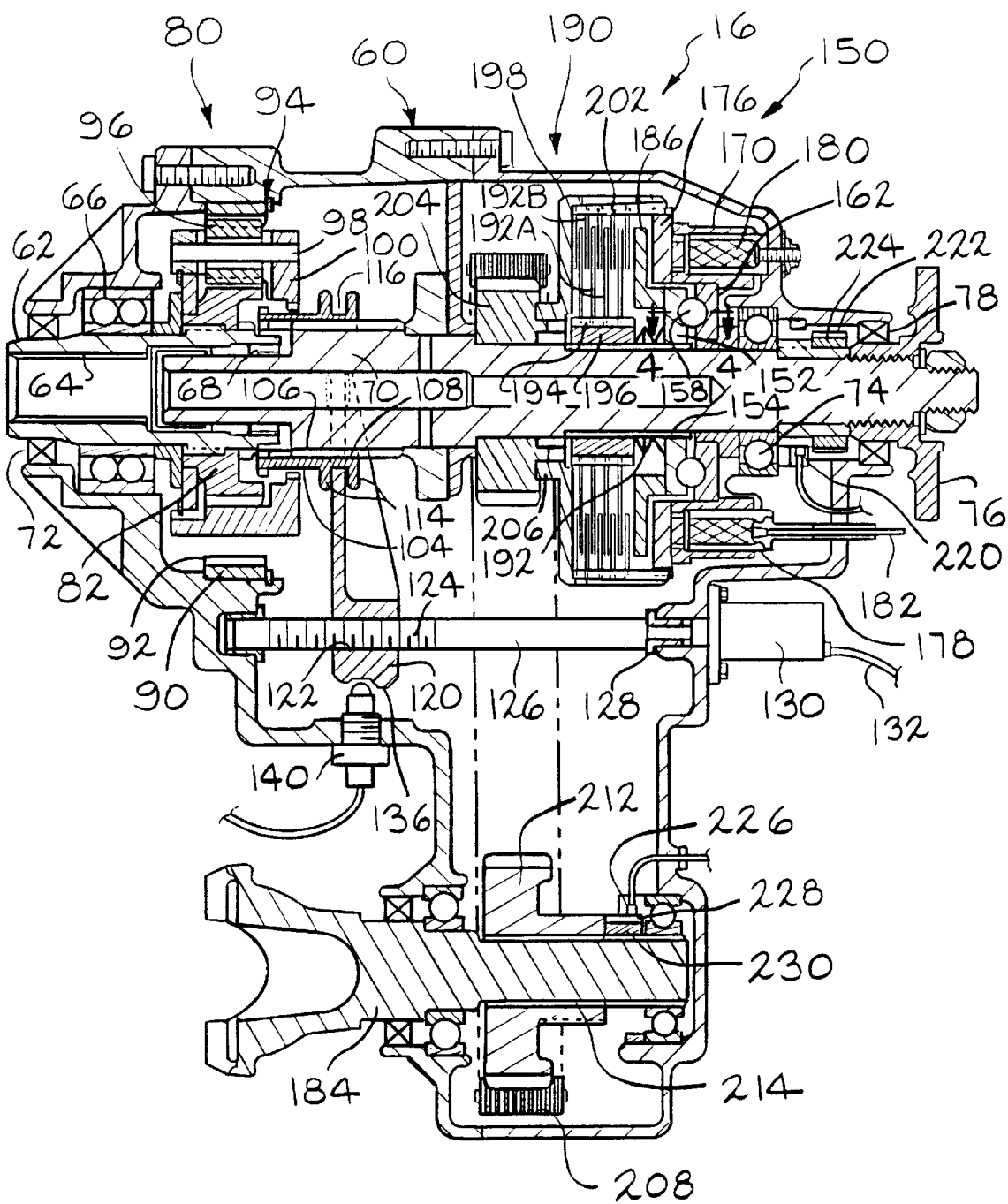
FIG. 2 is a full, sectional view of a transfer case incorporating the shift rail operator assembly of the present invention.

Referring now to FIGS. 1 and 2, the transfer case assembly 16 incorporating the present invention includes a multiple piece housing assembly 60 having a plurality of planar sealing surfaces, openings for shafts and bearings and various recesses, shoulders, counterbores and the like to receive various components or assemblies of the transfer case 16. An input shaft 62 includes female or internal splines or gear teeth 64 or other suitable coupling structures which drivingly couple the output of the transmission 14 illustrated in FIG. 1 to the input shaft 62. The input shaft 62 is rotatably supported at one end by an anti-friction bearing such as the ball bearing assembly 66 and at its opposite end by an internal anti-friction bearing such as the roller bearing assembly 68. The roller bearing assembly 68 is disposed upon a portion of a stepped output shaft 70. A suitable oil seal 72, positioned between the input shaft 62 and the housing assembly 60, provides an appropriate fluid tight seal therebetween. The opposite end of the output shaft 70 is supported by an antifriction bearing such as the ball bearing assembly 74 and may include a flange 76 which may be a portion of a universal joint 44 or may be secured to associated drive line components such as the primary propshaft 22. A suitable oil seal 78, disposed between the flange 76 and the housing assembly 60 provides an appropriate fluid tight seal therebetween.

Referring now to FIGS. 2 and 3, the transfer case assembly 16 includes a two-speed planetary gear drive assembly 80 disposed about the input shaft 62.

The planetary drive assembly 80 includes a sun gear 82 having a plurality of female or internal splines or gear teeth 84 which engage a complementary plurality of male splines or gear teeth 86 on the input shaft 62. The sun gear 82 is thus coupled to the input shaft 62 and rotates therewith. The sun gear 82 includes external or male gear teeth 88 about its periphery. Radially aligned with the sun gear 82 and its teeth 88 is a ring gear 90 having inwardly directed gear teeth 92. The ring gear 90 is retained within the housing assembly 60 by a cooperating circumferential groove and snap ring assembly 94. A plurality of pinion gears 96 are rotatably received upon a like plurality of stub shafts 98 which are mounted within and secured to a planet carrier 100. The planet carrier 100 includes a plurality of female or internal splines or gear teeth 102 disposed generally adjacent the male splines or gear teeth 86 on the input shaft 62. The planetary gear assembly 80 is more fully described in co-owned U.S. Pat. No. 4,440,042 which is herein incorporated by reference.

The planetary drive assembly 80 also include a dog clutch or clutch collar 104 defining female or internal splines or gear teeth 106 which are axially aligned with and, in all respects, complementary to the male splines or gear teeth 86 on the input shaft 62. The clutch collar 104 and its internal splines or gear teeth 106 are slidably received upon a complementary plurality of male or external splines or gear teeth 108 on the stepped output shaft 70. The clutch collar 104 thus rotates with the output shaft 70 but may translate bi-directionally along it. The clutch collar 104 also includes male or external splines or gear teeth 110 on one end which are in all respects complementary to the female splines or gear teeth 102 on the planet carrier 100.

Finally, the dog clutch or clutch collar 104 includes a pair of radially extending, spaced-apart flanges 114 on its end opposite the splines or gear teeth 110 which define a circumferential channel 116. The channel 116 receives a complementarily configured semi-circular throat or yoke 118 of a shift fork 120. The shift fork 120 includes a through passageway defining female or internal threads 122 which engage complementarily configured male or external threads 124 on a rotatable shift rail 126. The shift rail 126 is received within suitable journal bearings or bushings 128 and is coupled to and driven by a rotary electric, pneumatic or hydraulic motor 130. The rotary motor 130 is provided with energy through a line 132.

The end of the shift fork 120 opposite the semi-circular yoke 118 includes a cam 136 having a recess 138 and a first, taller or longer lug or projection 140H and a second, shorter lug or projection 140L having a height greater than, or at least distinct from, the recess 138. A three position sensor 144 having a roller or ball actuator 146 includes proximity or position sensors such as Hall effect sensors which provide outputs in a preferably multiple conductor cable 148 defining a first signal indicating that the shift fork 120 and associated clutch collar 104 is in the neutral position illustrated in FIGS. 2 and 3, that the shift fork 120 has moved to the left from the position illustrated such that the actuator 146 engages and is translated by the taller lug or projection 140H and the sensor 144 provides a signal indicating that the clutch collar 104 is in a position which selects high gear or direct drive, effectively by passing the planetary gear assembly 80, or, conversely, that the shift fork 120 has moved to the right from the position illustrated in FIGS. 2 and 3 such that the lug or projection 140L has engaged and translated the actuator 146 so that the sensor 144 indicates that the shift fork 120 has translated to select the low speed output or speed range of the planetary drive assembly 80. Such translation is achieved by selective bi-directional operation of the drive motor 130 which rotates the shift rail 126 and bi-directionally translates the shift fork 120 along the male threads 124 of the shift rail 126.

Figure 4:
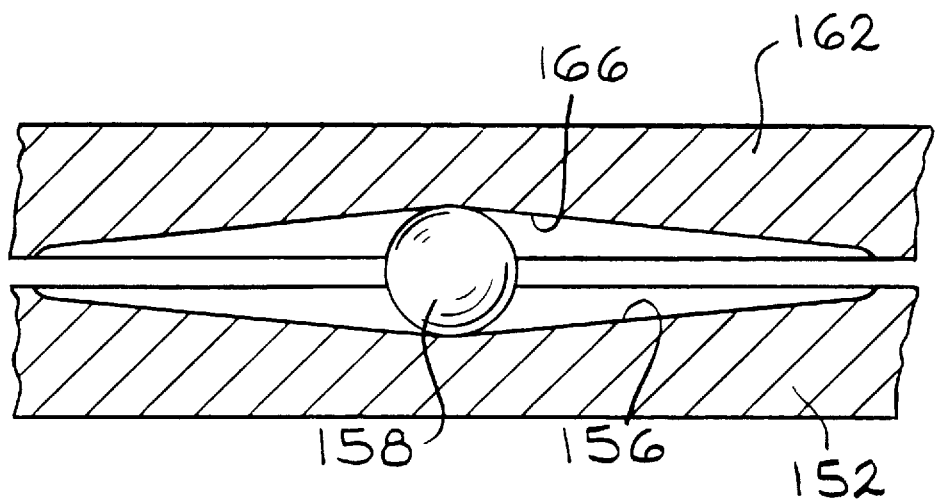
FIG. 4 is a flat pattern development of the ball ramp operator of a transfer case incorporating the present invention taken along line 4—4 of FIG. 2.

The transfer case assembly 16 also includes an electromagnetically actuated disc pack type clutch assembly 150. The clutch assembly 150 is disposed about the output shaft 70 and includes a circular drive member 152 coupled to the output shaft 70 through a splined interconnection 154. The circular drive member 152 includes a plurality of circumferentially spaced apart recesses 156 in the shape of an oblique section of a helical torus, as illustrated in FIG. 4. Each of the recesses 156 receives one of a like plurality of load transferring balls 158.

A circular driven member 162 is disposed adjacent the circular drive member 152 and includes a like plurality of opposed recesses 166 defining the same shape as the recesses 156. The oblique side walls of the recesses 156 and 166 function as ramps or cams and cooperate with the balls 158 to drive the circular members 152 and 162 apart in response to relative rotation therebetween. It will be appreciated that the recesses 156 and 158 and the load transferring balls 158 may be replaced with other analogous mechanical elements which cause axial displacement of the circular members 152 and 162 in response to relative rotation therebetween. For example, tapered rollers disposed in complementarily configured conical helices may be utilized.

The circular driven member 162 extends radially outwardly and is secured to a soft iron rotor 170. The rotor 170 is disposed in opposed relationship with an armature 176. The rotor 170 is U-shaped and surrounds a housing 178 containing an electromagnetic coil 180. A single or two conductor cable 182 provides electrical energy to the electromagnetic coil 180, Providing electrical energy to the electromagnetic coil 180 through the cable 182 causes magnetic attraction of the armature 176 to the rotor 170. This magnetic attraction results in frictional contact of the armature 176 with the rotor 170. When the output shaft 70 is turning at a different speed than the armature 176 which turns at the same rotational speed as a secondary output shaft 184, this frictional contact results in a frictional torque being transferred from the output shaft 70, through the circular drive member 152, through the load transferring balls 158 and to the circular driven member 162. The resulting frictional torque causes the balls 158 to ride up the ramps of the recesses 156 and 166 and axially displaces the circular drive member 152. Axial displacement of the circular drive member 152 translates an apply plate 186 axially toward a disc pack clutch assembly 190. A compression spring 192 provides a restoring force which biases the circular drive member 152 toward the circular driven member 162 and returns the load transferring balls 158 to center positions in the circular recesses 156 and 166 to provide maximum clearance and minimum friction between the components of the electromagnetic clutch assembly 150 when it is deactivated.

An important design consideration of the recesses 156 and 166 and the balls 158 is that the geometry of their design, the design of the compression spring 192 and the clearances in the clutch assembly 150 ensure that it is not self-engaging. The electromagnetic clutch assembly 150 must not self-engage but rather must be capable of modulated operation and torque transfer in direct response to a modulating input signal.

The disc pack clutch assembly 190 includes a plurality of interleaved friction plates or discs 192A and 192B. A first plurality of discs 192A are coupled by interengaging splines 194 to a clutch hub 196 which is, in turn, coupled to the output shaft 70 for rotation therewith. A second plurality of discs 192B are coupled to an annular housing 198 by interengaging splines 202 for rotation therewith.

The annular housing 198 is disposed for free rotation about the output shaft 70 and is rotationally coupled to a chain drive sprocket 204 by a plurality of interengaging lugs and recesses 206. The drive sprocket 204 is also freely rotatably disposed on the output shaft 70. A drive chain 208 is received upon the teeth of the chain drive sprocket 204 and engages and transfers rotational energy to a driven chain sprocket 212. The driven sprocket 212 is coupled to the secondary output shaft 184 of the transfer case 28 by interengaging splines 214.

The transfer case assembly 16 also includes a first Hall effect sensor 220 which is disposed in proximate, sensing relationship with a plurality of teeth 222 on a tone wheel 224. The tone wheel 224 is coupled to and rotates with the primary output shaft 70. A second Hall effect sensor 226 is disposed in proximate, sensing relationship with a plurality of teeth 228 of a tone wheel 230 disposed on the driven chain sprocket 212. Preferably, the number of teeth 222 on the tone wheel 224 is identical to the number of teeth 228 on the tone wheel 230 of the driven sprocket 212 so that identical shaft speeds result in the same number of pulses per unit time from the Hall effect sensors 220 and 226. This simplifies computations and improves the accuracy of all decisions based on such data. As to the actual number of teeth 222 on the tone wheel 224 and teeth 228 on the tone wheel 230, it may vary from thirty to forty teeth or more or fewer depending upon rotational speeds and sensor construction. The use of thirty-five teeth on the tone wheels has provided good results with the Hall effect sensors 220 and 226.

Referring now to FIG. 5, a first alternate embodiment of a single shift rail operator assembly according to the present invention is illustrated and designated by the reference number 240. The first alternate embodiment shift rail operator assembly 240 includes an electric, pneumatic or hydraulic drive motor 242 which is suitably secured to the housing assembly 60 of the transfer case assembly 16. The drive motor 242 includes an output shaft 244 having female or internal splines or gear teeth 246 which mate with complementarily configured male or external splines or gear teeth 248 disposed on the end of a shift rail 250. The shift rail 250 includes a region of male threads 252 which are received within a complementarily configured region of female threads 254 in the housing assembly 60. Alternatively, the female threads 254 may reside in an extension of the housing of the drive motor 242. Rotation of the shift rail 250 in a first direction axially translates it in a first direction and rotation of the shift rail 250 in the opposite direction axially translates it in the opposite direction. Preferably, the end of the shift rail 250 opposite the drive motor 242 is received and rotatably supported within a journal bearing or bushing 256 mounted in the housing assembly 60.

A shift fork 260 includes a through, cylindrical aperture or journal bearing 262 which has an inside diameter just slightly larger than the outside diameter of the shift rail 250. The shift fork 260 is thus freely rotatably received upon the shift rail 250. The shift fork 260 is axially restrained on the shift rail 250 by a pair of snap rings 264 received within complementarily configured circumferential grooves or channels 266 formed in the shift rail 250. A pair of flat washers 268 are preferably disposed between the snap rings 264 and the body of the shift fork 260. The shift fork 260 includes a conventional yoke 272 which receives the dog clutch or clutch collar 104 which is fully described above in the foregoing section relating to the preferred embodiment.

The shift fork 262 also includes a cam 274 having a centrally disposed recess 276 disposed between a first, longer lug or projection 278H and a second, shorter lug or projection 278L. A three position sensor 144 having a roller or ball actuator 146 includes proximity or position sensors such as Hall effect sensors which provide outputs in a preferably multiple conductor cable 148 defining a first signal indicating that the shift fork 260 is in the neutral position illustrated in FIG. 5, that the shift fork 260 has moved to the left from the position illustrated such that the actuator 146 is translated by the lug or projection 278H and the sensor 144 provides a signal indicating that the clutch collar 104 is in a position which selects high gear from the planetary drive assembly 80 or, conversely, that the shift fork 260 has moved to the right from the position illustrated in FIG. 5 such that the lug or projection 278L has moved into contact with the actuator 146 and the sensor 144 indicates that the shift fork 260 has translated to a position corresponding to selection of the low output or speed range of the planetary drive assembly 80. It will be appreciated that other details of operation of the first alternate embodiment shift rail assembly 240 are essentially the same as those of the preferred embodiment shift rail assembly.

Figure 6:
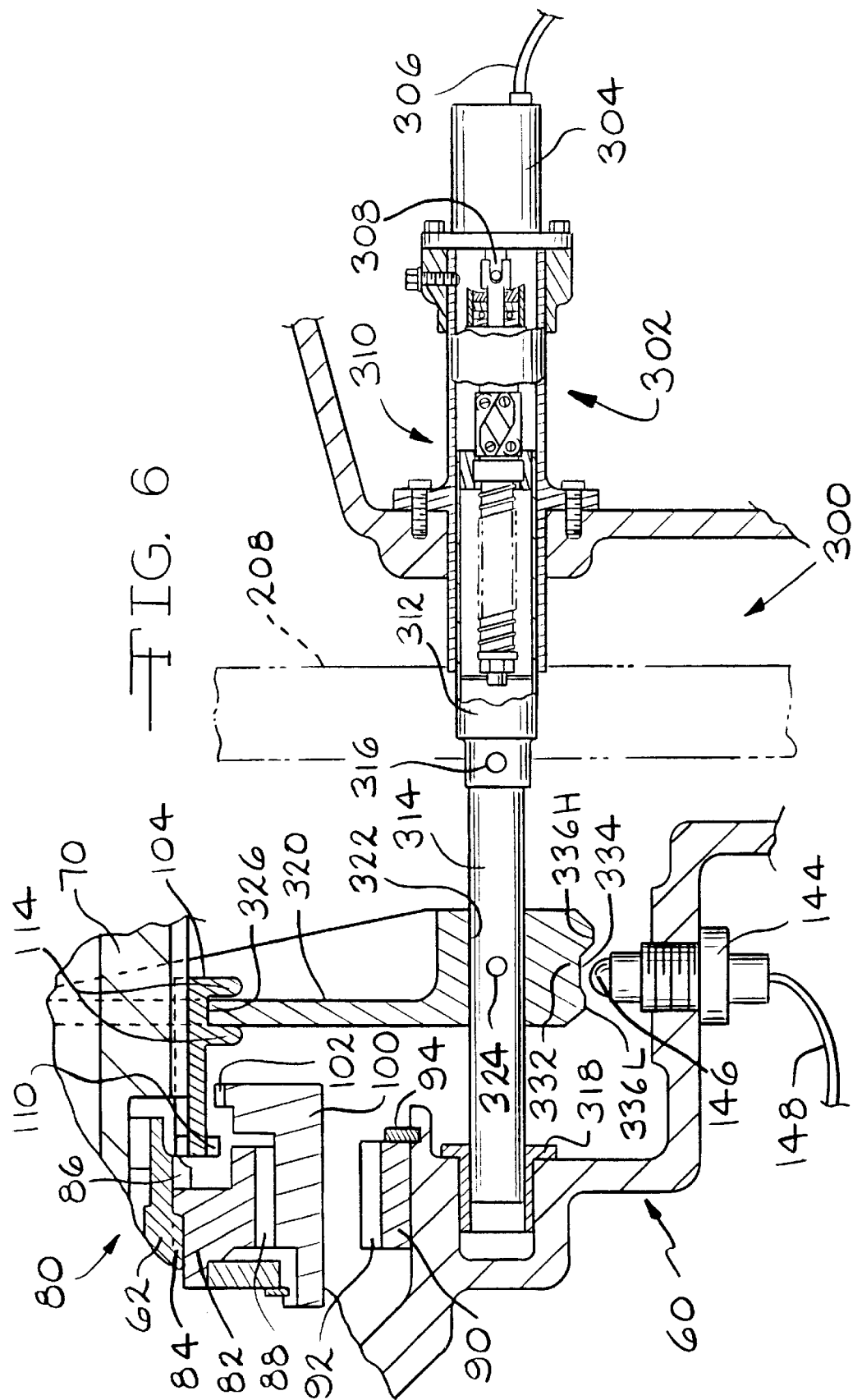
FIG. 6 is an enlarged, fragmentary, sectional view of a second alternate embodiment of a shift rail operator assembly according to the present invention.

Referring now to FIG. 6, a second alternate embodiment of a shift rail operator assembly according to the present invention is illustrated and designated by the reference number 300. The second alternate embodiment shift rail operator assembly 300 includes a ball screw operator assembly 302 which is suitably secured to the housing assembly 60 of the transfer case assembly 16. The ball screw operator assembly 302 includes an electric, pneumatic or hydraulic drive motor 304 which is provided with energy through a line 306. The drive motor 304 inclues an output shaft 308 which drives a conventional ball screw operator assembly 310 which converts bi-directional rotary motion of the output shaft 308 into bi-directional linear translation. The bi-directional linear translation of the ball screw assembly 310 is coupled to a telescoping tubular member 312 which translates bi-directionally into and out of the ball screw operator assembly 302.

A shift rail 314 is secured to the telescoping member 312 by any suitable means such as a pin or set screw 316. The opposite end of the shift rail 314 is preferably received with in a bushing or journal bearing 318 which is, in turn, mounted within the housing assembly 60. A shift fork 320 defines a through bore 322 which receives the shift rail 314. The shift fork 320 is securely attached to the shift rail 314 by a set screw or pin 324. The shift fork 320 includes a conventional throat or yoke 326 which seats within the channel 116 formed by the spaced apart-flanges 114 on the clutch collar 104. The shift fork 320 includes a cam 332 having a centrally disposed recess 334 interposed a first, longer or taller lug or projection 336H and a second, shorter or shallower lug or projection 336L. A three position sensor 144 having a roller or ball actuator 146 includes proximity or position sensors such as Hall effect sensors which provide outputs in a preferably multiple conductor cable 148 defining a first signal indicating that the shift fork 320 is in the neutral position illustrated in FIG. 6, that the shift fork 320 has moved to the left from the position illustrated such that the actuator 146 is translated by the lug or projection 336H and the sensor 144 provides a signal indicating that the clutch collar 104 is in the position which selects high gear from the planetary drive assembly 80 or, conversely, that the shift fork 320 has moved to the right from the position illustrated in FIG. 6 such that the lug or projection 336L has moved into contact with the actuator 146 and the sensor 144 indicates that the shift fork 320 has translated to select low gear or the reduced speed range output of the planetary drive assembly 80.

Three operational features of the preferred embodiment and the first and second alternate embodiment shift rail assemblies 240 and 300 significant. First of all, it will be appreciated that many prior art shift rail operator configurations include an energy absorbing spring or similar device which allows the shift operator to achieve a final position corresponding to a desired position of the clutch collar although the clutch collar may not have actually achieved such position due to clashing or interference of gear teeth. In such a design, the spring stores drive energy until gear synchronization has been achieved and the shift can be completed. A disadvantage of such designs is that certain shift rail position sensors may provide an indication that the shift has been completed when, in fact, it has not.

In the present system, the sensor 140 and its actuator 146 are located directly adjacent the actual shift fork 120 in the preferred embodiment and directly adjacent the shift forks 260 and 320 in the first and second alternate embodiments, respectively. The cams 138, 274 and 332 located directly on the shift forks 120, 260 and 320, respectively, sense and provide information to the control assembly 50 of the precise, actual location of the shift fork and improve logic and control decisions by eliminating any disparity between the commanded position of a shift fork and its actual position.

A second feature relates primarily to sizing of the drive motor 130, 242 and 304. Due to the mechanical advantage provided by the assemblies which convert rotary motion to linear motion, the power output of and the power delivered to and consumed by the drive motors 130, 242 and 304 may be relatively small. Thus, if a shift cannot be completed due to clashing of the gears, power may continue to be delivered to the drive motors 130, 242 and 304 and the motor will simply stall and continue to attempt to complete the commanded shift without causing any damage to itself or the associated components. With such a design, the control assembly 50 may include a timer which will sense an uncompleted shift and, at the end of its timed interval, provide an indication that the shift is not possible, return to the previous position and again attempt to complete the shift or provide or record a fault indication.

Last of all, a feature that is most readily achieved when using an electric drive motor 130, 242 or 304 relates to precise positioning of the shift forks 120, 260 and 320. It will be appreciated that once the sensor 140 has determined that the shift forks 120, 260 and 320 have achieved a desired position, circuitry in the control assembly 50 may terminate the supply of electricty to the motors 130, 242 and 302 and, in fact, couple, i.e., short together, the power leads to the motors 130, 242 and 302, together, thereby electricly braking the motor and quickly terminating its rotation. Thus, although the motors 130, 242 and 302 may rotate at a relatively high speed, electric braking may be utilized to accurately control and position the shift forks 120, 260, 320 and the clutch collar 104 and eliminate the need for mechanical brakes.

It will be appreciated that although the shift rail operator assembly of the present invention has been described in conjunction with a motor vehicle transfer case, the shift rail, associated rotary to linear motion conversion assemblies and shift fork position sensor will find broad application in related drive line components such as transmissions or as axle disconnects in differentials and in other applications.

The foregoing disclosure is the best mode devised by the inventor for practicing this invention. It is apparent, however, that apparatus incorporating modifications and variations will be obvious to one skilled in the art of drive line component shift assemblies. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

We claim:

1. A shift operator assembly for a motor vehicle drive line component comprising, in combination, a drive motor having a rotary output, an assembly for converting said rotary output of said drive motor into axial translation, said converting assembly including a splined output member on said drive motor, a shift rail having splines complementary to and engaged by said splined output member, a through aperture in said shift fork for freely, rotatably receiving said shift rail and axial stops adjacent said shift fork on said shift rail for inhibiting relative axial motion between said shift fork and said shift rail, an axially translatable clutch collar adapted to engage a first speed range output in a first position and a second, distinct speed range output in a second position, and a shift fork operably disposed between said converting assembly and said clutch collar.

2. The shift operator assembly of claim 1 further including a speed change assembly having at least a first output providing a first speed range and a second output providing a second, distinct speed range and wherein said clutch collar engages said first output in said first position and said second output in said second position.

3. The shift operator assembly of claim 1 further including a cam disposed for motion with said shift fork having at least two distinct regions and a position sensor operably disposed adjacent said cam for detecting said cam regions and providing two distinct outputs corresponding to said two cam regions.

4. A shift operator assembly for a motor vehicle drive line component comprising, in combination, a drive motor having a bi-directional rotary output, an assembly for converting said bi-directional rotary output of said drive motor into bi-directional axial translation, said converting assembly including a shift rail having a threaded portion, a bi-directionally axially translatable clutch collar, a shift fork including a complementarily threaded passageway for receiving said threaded portion of said shift rail and operably engaging said clutch collar, and a cam disposed for motion with said shift fork, said cam having at least two distinct regions and a position sensor disposed adjacent said cam for detecting said two cam regions.

5. The shift operator assembly of claim 4 wherein said clutch collar is adapted to engage a first speed range output in a first position and a second, distinct speed range output in a second position and further including a speed change assembly having at least a first output providing a first speed range and a second output providing a second, distinct speed range.

6. The shift operator assembly of claim 4 wherein said cam is integrally formed in said shift fork.

7. A single rail shift operator assembly for a motor vehicle drive line component comprising, in combination, a drive motor having a rotary output, an assembly for converting said rotary output of said drive motor into axial translation, said converting assembly including a shift rail having a threaded portion, a speed change assembly having at least a first output providing a first speed range and a second output providing a second, distinct speed range, an axially translatable clutch collar adapted to engage a first speed range output in a first position and a second, distinct speed range output in a second position, and a shift fork including a complementarily threaded passageway for receiving said threaded portion of said shift rail and operably engaging said clutch collar.

8. The single rail shift operator assembly of claim 7 further including a cam disposed for motion with said shift fork having at least two distinct regions and a position sensor operably disposed adjacent said cam for detecting said cam regions and providing two distinct outputs corresponding to said two cam regions.

9. A shift operator assembly for a motor vehicle drive line component comprising, in combination, a drive motor having a rotary output, an assembly for converting said rotary output of said drive motor into axial translation, said converting assembly including a non-rotating, bi-directionally translating shift rail and a ball screw operator assembly, an axially translatable clutch collar adapted to engage a first speed range output in a first position and a second, distinct speed range output in a second position, and a shift fork secured to said shift rail and operably engaging said clutch collar.

10. The shift operator assembly of claim 9 further including a cam disposed for motion with said shift fork having at least two distinct regions and a position sensor operably disposed adjacent said cam for detecting said cam regions and providing two distinct outputs corresponding to said two cam regions.

11. A shift operator assembly for a motor vehicle drive line component comprising, in combination, a drive motor having a bi-directional rotary output, an assembly for converting said bi-directional rotary output of said drive motor into bi-directional axial translation, said converting assembly including a splined output member on said drive motor, a shift rail having splines complementary to and engaged by said splined output member, a through aperture in said shift fork for freely, rotatably receiving said shift rail and axial stops adjacent said shift fork on said shift rail for inhibiting relative axial motion between said shift fork and said shift rail, a bi-directionally axially translatable clutch collar, a shift fork operably disposed between said converting assembly and said clutch collar, and a cam disposed for motion with said shift fork, said cam having at least two distinct regions and a position sensor disposed adjacent said cam for detecting said two cam regions.

12. A shift operator assembly for a motor vehicle drive line component comprising, in combination, a drive motor having a bi-directional rotary output, an assembly for converting said bi-directional rotary output of said drive motor into bi-directional axial translation, said converting assembly including a non-rotating, bi-directionally translating shift rail and a ball screw operator assembly, a bi-directionally axially translatable clutch collar, a shift fork secured to said shift rail and operably engaging said clutch collar, and a cam disposed for motion with said shift fork, said cam having at least two distinct regions and a position sensor disposed adjacent said cam for detecting said two distinct cam regions.

13. A single rail shift operator assembly for a motor vehicle drive line component comprising, in combination, a drive motor having a rotary output, an assembly for co nverting said rotary output of said drive motor into axial translation, said converting assembly includes a splined output member on said drive motor, a shift rail having splines complementary to and engaged by said splined output member, a through aperture in said shift fork for feeely, rotatably receiving said shift rail and axial stops adjacent said shift fork on said shift rail for inhibiting relative axial motion between said shift fork and said shift rail, a speed change assembly having at least a first output providing a first speed range and a second output providing a second, distinct speed range, an axially translatable clutch collar adapted to engage a first speed range output in a first position and a second, distinct speed range output in a second position, and a shift fork operably disposed between said conversion assembly and said clutch collar.

14. A single rail shift operator assembly for a motor vehicle drive line component comprising, in combination a drive motor having a rotary output, an assembly for converting said rotary output of said drive motor into axial translation, said converting assembly including a non-rotating, bi-directionally translating shift rail and a ball screw operator assembly, a speed change assembly having at least a first output providing a first speed range and asecond output providing a second, distinct speed range, an axially translatable clutch collar adapted to engage a first speed range output in a first position and a second, distinct speed range output in a second position, and a shift fork secured to said shift rail and operably engaging said clutch collar.

15. The single rail shift operator assembly of claim 14 further including a cam disposed for motion with said shift fork having at least two distinct regions and a position sensor operably disposed adjacent said cam for detecting said cam regions and providing two distinct outputs corresponding to said two distinct cam regions.

* * * * *